No. 879,752. PATENTED FEB. 18, 1908.
M. F. DOTY.
WHEEL GUARD.
APPLICATION FILED MAY 29, 1907.

Witnesses
K. Allen
R. Bunyea

Inventor
Maurice F. Doty,
By Victor J. Evans
Attorney

UNITED STATES PATENT OFFICE.

MAURICE F. DOTY, OF CHICAGO, ILLINOIS.

WHEEL-GUARD.

No. 879,752.  Specification of Letters Patent.  Patented Feb. 18, 1908.

Application filed May 29, 1907. Serial No. 376,383.

*To all whom it may concern:*

Be it known that I, MAURICE F. DOTY, a citizen of the United States of America, residing at Chicago, in the county of Cook and State of Illinois, have invented new and useful Improvements in Wheel-Guards, of which the following is a specification.

This invention relates to wheel guards designed for the purpose of preventing the wheels of cars from running over the arm or leg of a person that may be thrown under the car wheels.

One of the principal objects of the invention is to provide a shield or fender to be secured to the truck or wheel frame of a car and to project down near the track in front of the wheel to push an obstacle out of the way of a wheel while the car is under motion.

Another object of the invention is to provide a simple and efficient device to act as a fender for a car wheel, said fender having a removable block which will remove an obstruction from the track in front of the wheel.

Figure 1:
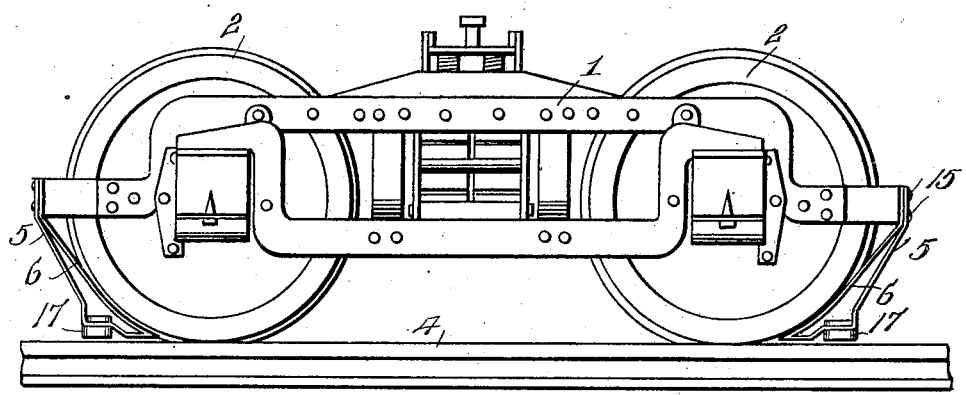
Figure 2:
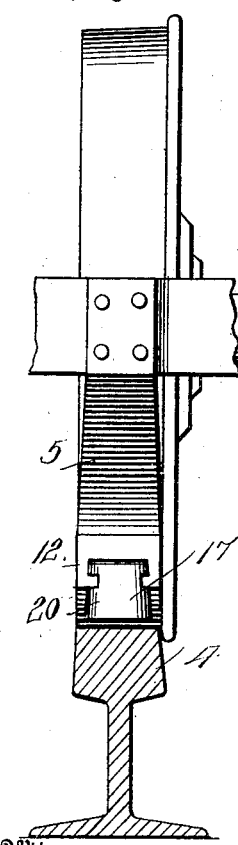
Figure 4:
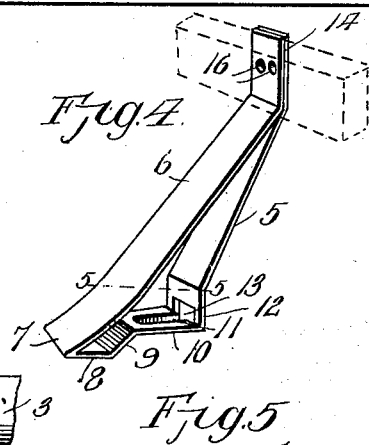
Figure 5:
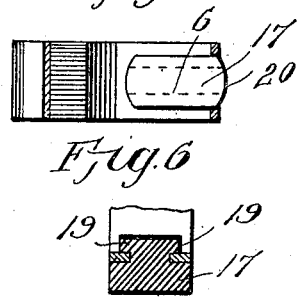
Figure 6:
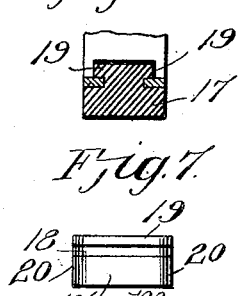
Figure 7:
Figure 3:
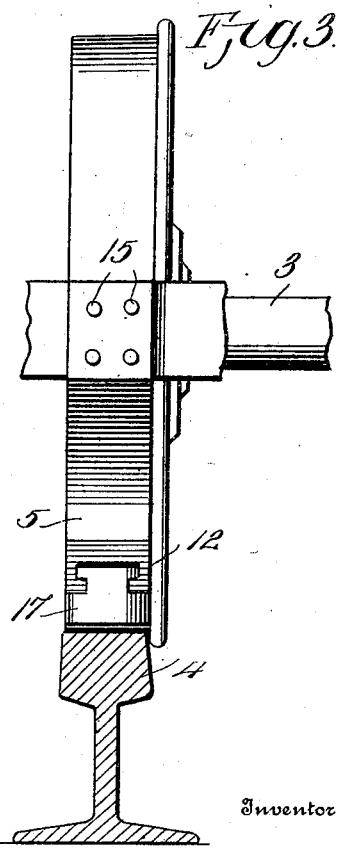

These and other objects may be attained by means of the construction illustrated in the accompanying drawing, in which:

Figure 1 is a side elevation of a car truck and wheels, and showing my improved fender or guard in position for use. Fig. 2 is a front elevation of one of the wheels and showing my improved fender in elevation and the track rail in section. Fig. 3 is a similar view showing a modified form of block. Fig. 4 is a detail perspective view of the guard or fender with the block removed. Fig. 5 is a sectional view on the line 5—5, of Fig. 4. Fig. 6 is a detail sectional view on the line 6—6 of Fig. 5. Fig. 7 is a side elevation of the fender block.

Referring to the drawing for a more particular description of my invention, the numeral 1 designates a car truck which may be of the usual or any suitable construction, and 2 are the car wheels mounted upon the axles 3, and 4 are the track rails. These parts may be of the usual or any suitable construction.

Secured to any suitable portion of the truck frame is a fender or guard 5 consisting of a strip of metal of the required thickness and strength, said strip being bent to form a member 6 which extends down to a point near the bearing portion of the wheel upon the track and forming a point 7. The fender extends backward from the point 7 to provide a portion 8 which lies substantially parallel with the tread portion of the rail, and an inclined portion 9 which continues to form a horizontal portion 10 provided with a slot 11. A vertical portion 12 provided with a slot 13 is connected to the inclined portion of the fender which extends up where the terminal ends 14 are secured by means of bolts 15 passed through the holes 16 in the fender and into any suitable projecting portion of the wheel frame.

A detachable block 17, preferably formed of wood or hard rubber, is provided with grooves 18 in the opposite sides thereof, and projecting flanges 19 above the grooves, while the lower portion projects outward to terminate on a line with the outer edges of the fender, as shown more particularly in Figs. 3 and 6, while in Fig. 2 the block does not extend out to the outer edge of the fender. The block is provided with rounded front and rear ends 20, as shown in Figs. 5 and 7. The block 17 is adapted to be slid through the slot 13 with the inner edges of the slot in the portion 10 fitting in the grooves 18 of the block, and thus holding the same in position for use.

From the foregoing it will be obvious that a fender made in accordance with my invention is of comparatively simple construction, can be readily attached to any form of car truck, which will operate efficiently for its purpose and in which the fender block may be readily removed for renewals. The device may be used either on street cars or for use on railway car wheels.

Having thus described the invention, what I claim is:

1. A car wheel fender or shield comprising a metal plate supported upon the car truck and provided with a curved arm extending under the tread surface of the wheel, a slot formed in said plate, and a removable block having oppositely disposed grooves and fitted in the slot of the plate, substantially as described.

2. A car wheel fender comprising a metal support having a curved arm extending down near the bearing surface of the wheel, said fender being secured to the car truck, and said fender being provided with a slot or aperture, and a removable fender block having oppositely disposed grooves secured to said fender, substantially as described.

In testimony whereof, I affix may signature in presence of two witnesses.

MAURICE F. DOTY.

Witnesses:
JAMES J. LEDDY,
C. F. WHITE.